United States Patent [19]
Mihailovic

[11] Patent Number: 5,647,198
[45] Date of Patent: Jul. 15, 1997

[54] RIGGING COMPONENT OF "THIMBLE-SHACKLE" TYPE

[75] Inventor: Pierre Mihailovic, Manson, France

[73] Assignee: Wichard, Thiers, France

[21] Appl. No.: 659,349

[22] Filed: Jun. 6, 1996

[30] Foreign Application Priority Data

Jun. 12, 1995 [FR] France .................. 95 07170

[51] Int. Cl.⁶ ........................... F16G 15/04
[52] U.S. Cl. ........................... 59/86; 59/93
[58] Field of Search .................. 59/78, 86, 93

[56] References Cited

U.S. PATENT DOCUMENTS 3,224,185 12/1965 Grim et al. .................. 59/86

FOREIGN PATENT DOCUMENTS

| 1277546 | 10/1961 | France . |
| 2460413 | 1/1981 | France . |
| 1297416 | 6/1969 | Germany . |
| 8509917 | 10/1985 | Germany . |
| 252932 | 11/1986 | Japan . |

*Primary Examiner*—David Jones
*Attorney, Agent, or Firm*—Oliff & Berridge

[57] ABSTRACT

According to the invention this component includes a shackle of conventional type, that is to say which has a U-shaped body of substantially uniform diameter, and includes an insert made of synthetic material overmolded on the rounded end and on the base of the side arms of the shackle, this insert including a central part of circular shape, of greater diameter than that of the body of the shackle, and side bulges demarcating, with this central part, a groove for receiving a rope.

14 Claims, 1 Drawing Sheet

RIGGING COMPONENT OF "THIMBLE-SHACKLE" TYPE

BACKGROUND OF THE INVENTION

The present invention relates to a rigging component of "thimble-shackle" type.

It is very commonplace, especially on a pleasure sailing craft, to secure a rope to an object by means of a shackle, in particular to secure a halyard to a sail.

Such a shackle includes a U-shaped body, of substantially uniform diameter, the parallel arms of which are extended by two coaxial rings at their free ends. These rings receive a pin which closes the shackle, it being possible for this pin to be immobilized either by screwing, one of the rings then being tapped, or by the engagement of a notch arranged on the pin in a corresponding indentation arranged on one of the rings. On a pleasure sailing craft the shackles have a body of diameter generally ranging from 3 to 8 millimeters.

Some ropes secured with these shackles, in particular the halyards, may be subjected to great and prolonged tensile stresses. The diameter of the shackles is relatively small in relation to that of the rope, and this results in an effect of shearing of the rope in cases where tensile stresses are great and prolonged. This shearing effect can halve the breaking threshold of the rope.

Further more the rubbing of the rope against the shackle is concentrated on a limited stretch of the rope, which is precisely that destined to be subjected to this shearing effect. The wear which results therefrom contributes to the risk of the rope breaking well before its maximum strength threshold.

To overcome this great disadvantage it is usual to form a bight at the end of a rope by means of a splice, and to place a thimble inside this bight. This thimble has a radius of curvature which is sufficient to eliminate the abovementioned shearing effect and is made of metal or synthetic material capable of withstanding the repeated rubbing against the shackle.

However, the disadvantage of these splices is that they are relatively lengthy and costly to produce. In addition, some ropes of braided form, frequently employed for the halyards in view of their resistance to stretching, cannot be spliced and therefore cannot receive such thimbles.

In addition, thimbles and splices have relatively large lengths, which are added to those of the shackles. In some cases this length, which is necessary for securing the rope, may be a hindrance, for example in the case of a mainsail halyard, since it can restrict the possibilities of sweating-up.

There are rigging components known as "thimble-shackles", made as a single forged or cast component, like a conventional shackle, in which the rounded part of the shackle includes side bulges at the base of the rectilinear arms and, between these bulges, has a diameter larger than that of the remainder of the body.

These side bulges demarcate a groove intended to receive the rope, and the widened diameter of the shackle at this groove increases the radius of the rope winding, and this allows the shearing effect to be limited.

Such a thimble-shackle has the disadvantage of requiring a specific forging or casting tooling which is costly to manufacture. In addition, this thimble-shackle is bulky and heavy, which is hardly desirable, bearing in mind the slatting to which the sails can be subjected. It is also particularly costly as a result of its process of manufacture and of the additional material which it includes.

These weight and cost requirements, as well as the constraints due to the casting work, further restrict the shapes which this shackle can be given, especially with regard to the diameter of the bottom of the groove and the dimensions of the abovementioned side bulges.

Furthermore, these thimble-shackles include a transverse shank, substantially halfway along their body, intended to prevent the rope from moving too far away from the groove in the event of the tension being released, and from rubbing on the remainder of the shackle body. Were such a transverse shank to be lacking, the shackle could pivot in relation to the rope and the pull would be applied out of line.

Fitting this shank in position involves piercing holes in the body of the shackle and then inserting and securing the shank, which is relatively complex and costly to carry out.

In addition, the appearance of the existing thimble-shackles is not very attractive and does not allow them to be easily picked out from a collection of shackles when these are of different sizes.

SUMMARY OF THE INVENTION

The present invention aims to overcome all these disadvantages by providing a rigging component of the thimble-shackle type which is simple to produce, light-weight and low in cost.

To this end, this component includes a shackle of conventional type, that is to say which has a U-shaped body of substantially uniform diameter, and includes an insert made of synthetic material overmolded on the rounded end and on the base of the side arms of the shackle, this insert including a central part of circular shape, of greater diameter than that of the body of the shackle, and side bulges demarcating, with this central part, a groove for receiving a rope.

Thus, the invention consists in converting a conventional shackle into a thimble-shackle by equipping this conventional shackle with a suitable insert.

The thimble-shackle obtained can be produced by a conventional overmolding technique which is simple and not very costly to use.

The synthetic material employed, preferably polypropylene, closely matches the shape of the body of the shackle by virtue of this overmolding, and this ensures perfect behavior of the insert when pulled.

The molding of a synthetic material involves fewer constraints than the casting of a metallic material, and this allows the groove to be given a diameter and dimensions which ensure, besides the limitation in the shearing effect on the rope, an increase in the area of friction, in order to reduce the wear on the rope, and perfect guidance of the rope in the groove.

In addition, this thimble-shackle has a weight that is barely greater than that of a conventional shackle, and which is of the order of 30 to 40% smaller than that of a thimble-shackle according to the prior art.

The cost of this thimble-shackle remains limited, bearing in mind the relatively low cost of implementing an overmolding technique and the low cost of the synthetic material employed.

The insert preferably includes at least one boss which is embodied in it, which lies along the base of one arm of the shackle, on the inner side of the latter.

This boss or these bosses allow the rope to be held against the wall of the insert forming the bottom of the groove when the tension is released. As a result, it is not necessary to fit a transverse shank, as on the thimble-shackles of the prior art.

This boss or these bosses are simple to produce, since they are embodied in the insert and since they are molded at the same time as the latter.

According to a preferred embodiment of the invention the insert includes two bosses facing one another, ensuring perfect holding of the rope in the groove.

Advantageously, the synthetic material of which the insert is made is colored. This coloring enables the rigging component to be given an attractive appearance. In addition, when several different colors are employed for shackles of different diameters, a shackle of specific dimensions can be immediately identified in a collection of shackles.

To make it properly understood, the invention is described again below with reference to the attached diagrammatic drawing showing, by way of example, without any limitation being implied, a preferred embodiment of the rigging component to which it relates.

DETAILED DESCRIPTION

Figure 1:
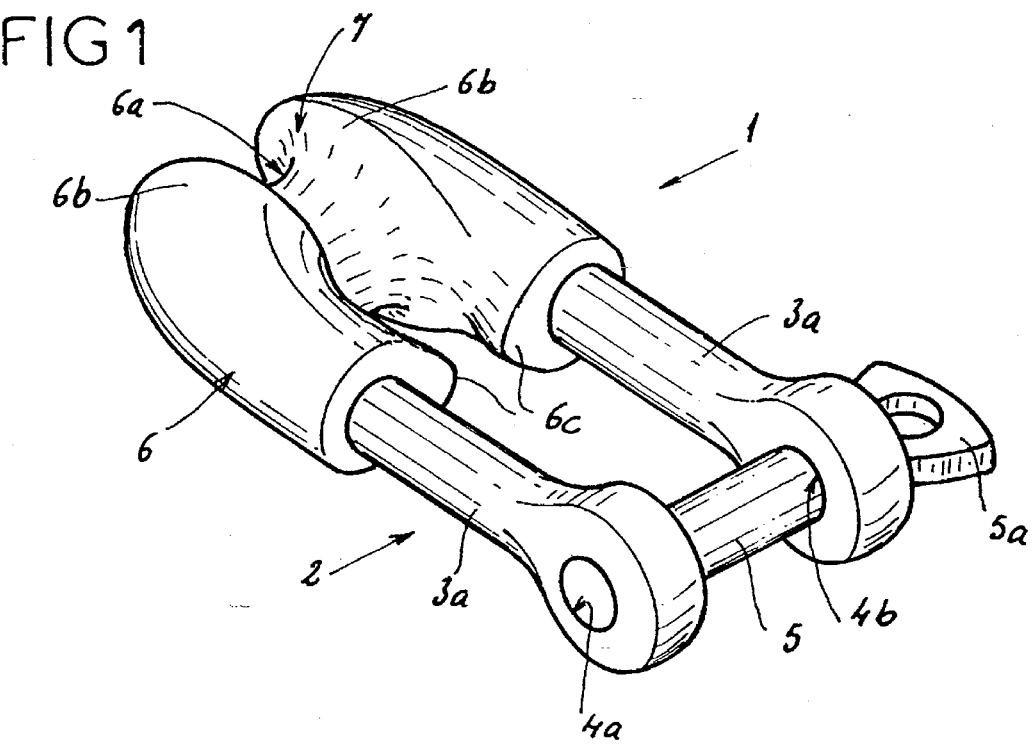
FIG. 1 is a view thereof in perspective.

The figures show a rigging component 1 of "thimble-shackle" type.

This component 1 includes a shackle 2 of conventional type. Such a shackle has a U-shaped body 3 whose parallel arms 3a are provided with two coaxial rings 4a, 4b at their free end. The ring 4a is tapped, and these two rings 4a, 4b receive a pin 5 by screwing, so as to close the shackle 2.

The pin 5 has a flattened end 5a, enabling it to be maneuvered manually.

The diameter of the shank forming the body 3 corresponds to that of the shackles generally employed on pleasure sailing craft, namely 3 to 8 millimeters.

Figure 2:
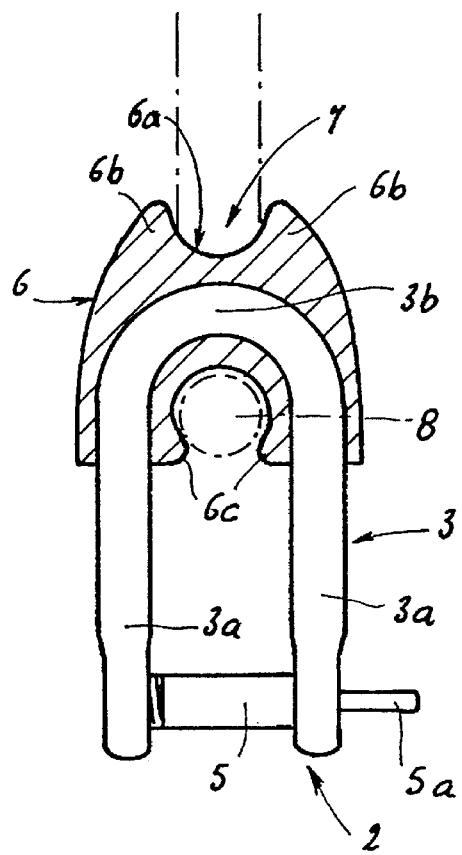
FIG. 2 is a view thereof in lengthwise section.

The component 1 also includes an insert 6 made of polypropylene, overmolded on the rounded end 3b of the body 3 and on the base of the side arms 3a. This insert 6 includes:

a central part 6a of circular shape, of greater diameter than the body 3, side bulges 6b demarcating, with this central part 6a, a groove 7 for receiving a rope 8, shown by broken lines in FIG. 2, and two bosses 6c opposite one another, embodied in the insert 6, lying along the base of the arms 3a on the inner side of the latter.

This insert 6 thus allows the conventional shackle to be converted into a thimble-shackle, that is to say into a shackle which has a groove 7 making it possible to limit the shearing effect on the rope 8 in the event of great and prolonged tensile stresses.

FIG. 2 shows that the insert 6 closely matches the shape of the body 3 of the shackle, by virtue of its overmolding on this body 3, and this ensures its perfect behavior when pulled.

This insert 6 enables the groove 7 to be given a diameter and dimensions which, besides the limitation of the shearing effect on the rope 8, ensure an increase in the area of friction, in order to reduce the wear on the rope 8, and perfect guiding of the rope 8 in the groove 7.

The component 1 has, furthermore, a weight that is barely greater than that of a conventional shackle, and can be manufactured at a cost which remains limited, bearing in mind the relatively low cost of implementation of an overmolding technique and the low cost of the synthetic material employed.

The bosses 6c allow the rope 8 to be held perfectly against the bottom of the groove 7 and thus prevent this rope 8 from coming out of the groove 7 when the tension is released. These bosses 6c are simple to produce, since they are embodied in the insert 6 and since they are molded at the same time as the latter.

I claim:

1. A thimble-shackle type rigging component, comprising:

a U-shaped body comprising a rounded end portion and two arms, a base of each of the arms being adjacent the rounded end portion; and an insert that surrounds an exterior of the rounded end portion and an exterior of the base of each of the arms of the U-shaped body, wherein the insert includes side bulges surrounding the bases of the arms and a central portion located between the side bulges, the central portion being concentric with the rounded end portion and having a substantially circular cross-sectional shape with a diameter that is greater than a diameter of the U-shaped body, and wherein the side bulges and the central portion form a groove for receiving a rope.

2. The rigging component as claimed in claim 1, wherein the insert comprises a synthetic material that is overmolded onto the U-shaped body.

3. The rigging component as claimed in claim 2, wherein the insert comprises polypropylene.

4. The rigging component as claimed in claim 3, wherein the insert is colored.

5. The rigging component as claimed in claim 1, wherein the arms have inner and outer sides, the inner sides facing one another, and wherein the includes at least one boss formed along the inner side of the base of at least one arm of the U-shaped body.

6. The rigging component as claimed in claim 5, wherein the insert includes two bosses, and wherein each boss is formed on a respective inner side of the base of an arm of the U-shaped body such that the bosses face one another.

7. The rigging component as claimed in claim 1, wherein the insert comprises a colored material.

8. The rigging component as claimed in claim 1, wherein the U-shaped body has a substantially uniform diameter.

9. The rigging component as claimed in claim 1, wherein the insert completely surrounds the exterior of the rounded end portion and the bases of the arms.

10. A thimble-shackle type rigging component, comprising:

a U-shaped body having a rounded end portion and two arms, the arms having inner and outer sides, the inner sides facing one another, a base of each of the arms being adjacent the rounded end portion; and an insert that surrounds at least a portion of an exterior of the rounded end portion and at least a portion of an exterior of the base of each of the arms, wherein the insert comprises:

side bulges surrounding the bases of the arms, a central portion located between the side bulges, wherein the side bulges and the central portion form a groove for receiving a rope, and at least one boss formed along the inner side of at least one arm of the U-shaped body, wherein space separates the at least one boss and the inner side of the opposing arm.

11. The rigging component as claimed in claim 10, wherein the insert includes two bosses, wherein each boss is formed on a respective inner side of the base of an arm of the U-shaped body such that the bosses face one another, and wherein a space separates the bosses.

12. The rigging component as claimed in claim 10, wherein the insert comprises a synthetic material that is overmolded onto the U-shaped body.

13. The rigging component as claimed in claim 10, wherein the insert comprises polypropylene.

14. The rigging component as claimed in claim 10, wherein the insert is colored.

* * * * *